Figure 1:
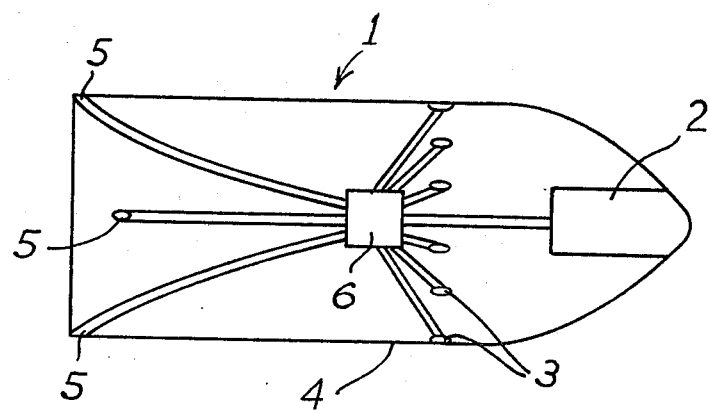

United States Patent [19]
Tubeuf

[11] 3,977,629
[45] Aug. 31, 1976

[54] PROJECTILE GUIDANCE

[75] Inventor: Jean Tubeuf, Le Chesnay, France

[73] Assignee: Societe Europeene de Propulsion, Paris, France

[22] Filed: Sept. 19, 1974

[21] Appl. No.: 507,565

[30] Foreign Application Priority Data
Sept. 21, 1973 France .............................. 73.34005

[52] U.S. Cl. .............................................. 244/3.22
[51] Int. Cl.² ............................................ F41G 9/00
[58] Field of Search ................................... 244/3.22

[56] References Cited
UNITED STATES PATENTS

| | | | |
|---|---|---|---|
| 3,208,383 | 9/1965 | Larson .............................. | 244/3.22 |
| 3,246,863 | 4/1966 | Posingies .......................... | 244/3.22 |
| 3,278,140 | 10/1966 | Evans ................................ | 244/3.22 |
| 3,325,121 | 6/1967 | Banaszak et al. .................. | 244/3.22 |
| 3,502,285 | 3/1970 | Gambill ............................. | 244/3.22 |
| 3,726,496 | 4/1973 | Leonard ............................. | 244/3.22 |
| 3,740,003 | 6/1973 | Ayre et al. ......................... | 244/3.22 |

*Primary Examiner*—Verlin R. Pendegrass
*Attorney, Agent, or Firm*—Eyre, Mann, Lucas & Just

[57] ABSTRACT

A projectile guidance system employs entry and exit ports for the ambient fluid medium with fluidic circuits interconnecting various of the entry and exit ports so that asymmetry of the flow through the ports will be induced merely by regulating the flow in any given fluidic circuit. Control means signalling trajectory correction instructions is effective to regulate the flow to orient the asymmetry such as to induce the desired yawing torque on the projectile. Where the projectile is spinning the regulating effect will be switched between the ports and will be effective at a station 90° displaced about the projectile longitudinal axis of symmetry from the direction in which yawing movement is desired.

5 Claims, 2 Drawing Figures

PROJECTILE GUIDANCE

The present invention relates to guiding the trajectory of a ballistic or propelled projectile. For improving the accuracy of the trajectory of a missile it is known to provide means suitable for altering the orientation of the thrust of the engine. This result can be achieved in various ways such as orientation of the propulsion gas exhaust nozzle, or a modification of the internal gas flow in this nozzle, or in other cases the use of steerable aerodynamic control surfaces on the missile.

These various means require the presence of a propulsion system or of aerodynamic control surfaces and cannot always be used.

It is an object of the invention to provide means for guiding a projectile without having recourse to conspicuous movable control surfaces.

According to the present invention there is provided a projectile comprising control means for signalling trajectory correction instructions, means defining at least one entry port for the ambient fluid medium, means defining at least one exit port for said ambient fluid medium and means connecting said exit and entry ports; said connecting means comprising an assembly of fluidic circuits and means responsive to said trajectory instructions signalled by the control means for regulating the flow of fluid through at least one of said fluidic circuits for controlling flow through at least one of said entry and exit ports which is offset relative to the longitudinal axis of symmetry of said projectile.

An advantage of the guidance system of the present invention resides in the fact that the device readily withstands major accelerations or vibrations.

Figure 2:
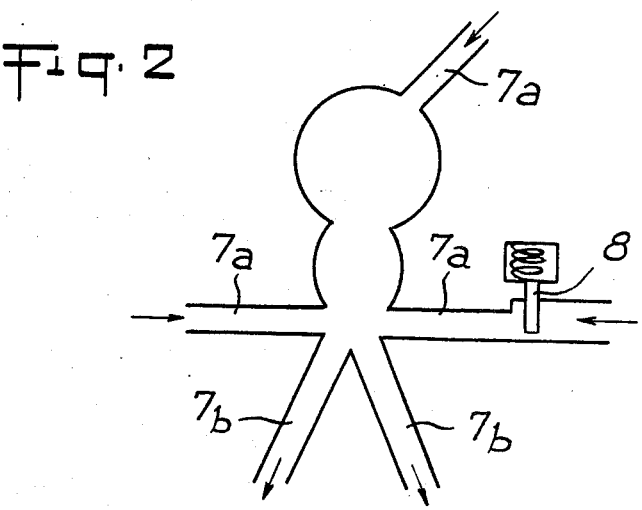

In order that the present invention may more readily be understood the following description is given, merely by way of example, with reference to the accompanying drawing, in which:

FIG. 1 is a schematic sectional view of a projectile provided with the control device according to the invention; and FIG. 2 is a detailed schematic sectional view of the shut-off means of the fluidic circuits.

In FIG. 1 there is shown a projectile 1 comprising control apparatus 2 known per se and which is capable of generating or receiving trajectory correction instructions, either by optical or radio-electric observation of the target or by measuring the distance to a guide beam, or by any other means.

The projectile 1 is provided with entry ports 3 for the fluid of the ambient medium such as air or water, depending on whether the said projectile is aerial or submarine. The entry ports 3 are symmetrically arranged around the periphery of the body 4 of the projectile 1 in the manner of a ring. The entry ports 3 are connected to an array of one or more, in this case several, exit ports 5 for the ambient medium through the intermediary of an assembly 6 of fluidic circuits to which the entry ports 3 feed the ambient fluids, for example, compressed air, the said assembly of circuits 6 being connected to the control apparatus 2.

By the action of any suitable means, preferably an assembly of magnetostrictive actuators, the flow of fluid entering each entry port 3 can be controlled, and in any case the entry and exit ports are connected so that the fluid entering any one entry port can leave through all the exit ports 5 or only some of them. At least one of the entry ports or exit ports is offset relative to the longitudinal axis of symmetry of the projectile.

In this event the aerodynamic forces acting on the projectile cease to be symmetric and a torque is developed which has its representative vector no longer parallel to the axis of the projectile. Under the combined effect of this torque and of its own rotation the projectile yaws with respect to its trajectory, thus subjecting itself to aerodynamic forces of considerable magnitude which are capable of correcting its trajectory.

In order to make allowance for the gyroscopic effects which have thus come into being when the projectile is spinning about its longitudinal axis of symmetry it is necessary for the torque applied to the projectile to be offset by 90° relative to the desired direction of movement. Thus where yawing of the projectile is required about a given transverse axis, the result is obtained simply by causing control air to leave through that exit port 5 which is 90° displaced relative to the orientation of the desired movement on the body of the projectile, i.e. that exit port which lies in the longitudinal plane which includes the transverse axis in question. Since the projectile constantly rotates, the exit ports to be controlled will be continually switched. Thus, in order to obtain a correction, for example an upward correction of the nose of the projectile, the ports will be switched so that the air will at any instant be exiting through one of the horizontally situated exit ports 5, to the right or left of the port which lies in the desired direction of movement, depending on the sense of rotation of the projectile.

Since the amplitudes of deformations obtainable by magnetostriction are small, an amplification of the variation of air flow can be obtained by incorporating the magnetostrictive actuator in a fluidic amplifier such as the closed momentum proportional amplifier of FIG. 2. In this embodiment the supply 7a and the two control ports 7a are fed from the inlet port 3 and the exit ports 5 are connected to amplifier output 7b. The magnetostrictive actuator controls a valve shutter 8 which can apply a fluidic control input signal to the amplifier for varying the output signal in ducts 7b.

The present invention is, of course, not confined to the above described embodiment but rather covers any variant. Thus the arrangement of the entry and exit ports 3 and 5 can be altered. In fact, it is possible to control the opening of one or more peripheral entry ports 3 which would be connected for example to an exit port located on the axis of symmetry of the projectile. In this event it is clear that the air fed under pressure to the single exit port comes from an entry port which is offset relative to the axis of symmetry of said projectile.

In one variant, not shown, it is the exit ports 5 which are controlled by the control apparatus 2 and not the entry ports 3 as is the case in the FIG. 1 illustration.

The advantages of the novel guidance procedure according to the present invention are quite obvious: by systematically eliminating all movable articulated members jutting out from the contour of the projectile it is possible to obtain a device which is adapted to resist the vibrations and initial accelerations which are typical of the flight cycle of a projectile.

The use of magnetostrictive actuators for closing or partially or totally opening the air flow passages contributes to increasing this robustness in the face of severe accelerations but is not indispensible. Other suitable control means may be employed if desired. Finally, it is clear that the use of this technique in self-propelled contrivances which cannot conveniently be fitted with steerable aerodynamic control surfaces enables perfectly guided projectiles to be obtained.

I claim:

1. In combination with a spinning projectile having no external aerodynamic control surfaces the improvement of a projectile control system which comprises:
   a. means for signalling trajectory correction instructions;
   b. means defining at least one entry port for the ambient fluid medium;
   c. means defining at least one exit port for said ambient fluid medium and means connecting said exit and entry ports;
   d. said entry and exit ports being offset relative to the longitudinal axis of symmetry of said projectile;
   e. said connecting means comprising an assembly of fluidic circuits; and
   f. magnetostrictive means responsive to said trajectory instructions signalled by a control means for regulating the flow of fluid through at least one of said fluidic circuits for controlling flow through at least one of said entry and exit ports.

2. A projectile control system as set forth in claim 1, wherein said means for regulating the flow of fluid through at least one of the fluidic circuits comprises a movable shutter actuated by said magnetostrictive drive means.

3. A projectile control system as set forth in claim 1, wherein said control means is adapted to generate a trajectory correction signal requiring yawing of the projectile about a first transverse axis and to transmit that correction signal to the flow regulating means associated with the fluidic circuit connected between entry and exit ports lying in that longitudinal plane of the projectile which includes the said first axis.

4. A projectile comprising control means for signalling trajectory correction instructions and guiding means responsive to said control means, said guiding means comprising a plurality of entry ports for the ambient fluid medium arranged around periphery of the body of the projectile, at least an exit port for the ambient fluid medium, an assembly of fluidic circuits located within the body of the projectile and interconnecting said entry and exits ports, and means for regulating the flow of fluid through said fluidic circuits in order to selectively control the flow of fluid passing through at least one of said entry and exit ports which is offset relative to the longitudinal axis of symmetry of the projectile, said regulating means comprising magnetostrictive actuator means responsive to said control means.

5. A projectile as set forth in claim 4 wherein said regulating means comprises fluid amplifier means having a control port and said magnetostrictive actuator means comprises a movable shutter and magnetostrictive drive means for actuating said shutter and applying a fluidic control input signal to said control port.

* * * * *